(12) United States Patent
Hou et al.

(10) Patent No.: US 12,140,719 B2
(45) Date of Patent: Nov. 12, 2024

(54) CORRECTION METHOD FOR MICRO SEISMIC INTERPRETATION FRACTURING FRACTURE PARAMETER RESULT

(71) Applicant: CHINA UNIVERSITY OF PETROLEUM (BEIJING), Beijing (CN)

(72) Inventors: Bing Hou, Beijing (CN); Yue Xiao, Beijing (CN); Yan Jin, Beijing (CN); Bowen Cao, Beijing (CN); Mian Chen, Beijing (CN)

(73) Assignee: CHINA UNIVERSITY OF PETROLEUM (BEIJING), Beijing (CN)

( * ) Notice: Subject to any disclaimer, the term of this patent is extended or adjusted under 35 U.S.C. 154(b) by 500 days.

(21) Appl. No.: 17/593,927

(22) PCT Filed: Jul. 7, 2020

(86) PCT No.: PCT/CN2020/100548
§ 371 (c)(1),
(2) Date: Sep. 28, 2021

(87) PCT Pub. No.: WO2021/004442
PCT Pub. Date: Jan. 14, 2021

(65) Prior Publication Data
US 2022/0206174 A1    Jun. 30, 2022

(30) Foreign Application Priority Data
Jul. 11, 2019 (CN) .................... 201910626869.X (51) Int. Cl.
*G01V 1/30* (2006.01)
*E21B 43/267* (2006.01)
(Continued)

(52) U.S. Cl.
CPC ............ *G01V 1/301* (2013.01); *E21B 43/267* (2013.01); *E21B 49/00* (2013.01);
(Continued)

(58) Field of Classification Search
CPC .. G01V 1/301; G01V 2210/646; G01V 1/288; G01V 1/28; G01V 1/282;
(Continued)

(56) References Cited

U.S. PATENT DOCUMENTS

2010/0256964 A1* 10/2010 Lee ..................... G01V 11/00
703/10

FOREIGN PATENT DOCUMENTS

CN    104730596 B   * 11/2017
CN    108316908 A   *  7/2018    ............ E21B 43/26

OTHER PUBLICATIONS

B. Wang et al. "A Comprehensive Formation Evaluation Method to Make the Fracturing Decision: A Real Case Analysis from a Low Permeability Formation in Jungger Basin of China." The International Petroleum Technology Conference, Beijing, China, Mar. 2013. (Year: 2013).*
(Continued)

*Primary Examiner* — Eman A Alkafawi
*Assistant Examiner* — Dilara Sultana
(74) *Attorney, Agent, or Firm* — HAUPTMAN HAM, LLP (57) ABSTRACT

A correction method for a microseism interpretation fracturing fracture parameter result. The method includes classifying the communication modes of a block sampling fractured wells to be corrected according to the matching degree of micro seismic monitoring result and sand adding amount; correcting the volume coefficient of each said
(Continued)

classified fractured well single well, and the volume correction coefficient Bv of each said fractured well is:

$$B_v = \frac{[L^{5/4}H]_T}{[L^{5/4}H]_W},$$

wherein, $[L^{5/4}H]_W$ is a calculation value of a micro seismic monitoring interpretation result; $[L^{5/4}H]_T$ is a theoretical calculation value obtained by using field construction parameters; C, calculating the classification volume correction coefficient of each class of fractured wells according to the calculated single well volume correction coefficient of each said fractured well. The micro seismic interpretation result can be corrected in combination with the field construction parameters, so that the micro seismic monitoring data can be utilized to truly interpret the effective fracture morphology after fracturing.

10 Claims, 6 Drawing Sheets

(51) Int. Cl.
*E21B 49/00* (2006.01)
*G06F 18/2431* (2023.01)

(52) U.S. Cl.
CPC ...... *G06F 18/2431* (2023.01); *E21B 2200/20* (2020.05); *G01V 2210/646* (2013.01)

(58) Field of Classification Search
CPC . G01V 1/306; G01V 1/30; G01V 1/50; G01V 3/38; G01V 1/42; G01V 1/36; G01V 2210/624; G01V 2210/123; G01V 2210/663; E21B 43/267; E21B 49/00; E21B 2200/20; E21B 43/26; G06F 18/2431; G06F 18/2135; G06F 18/24; G06F 30/20
See application file for complete search history.

(56) References Cited

OTHER PUBLICATIONS

First Office Action issued in priority Chinese Application No. 201910626869.X; mailed Sep. 1, 2020; 8 pgs.
International Search Report and Written Opinion issued in corresponding International Application No. PCT/CN2020/100548; mailed Sep. 29, 2020; 16 pgs.

* cited by examiner

CORRECTION METHOD FOR MICRO SEISMIC INTERPRETATION FRACTURING FRACTURE PARAMETER RESULT

TECHNICAL FIELD

The invention relates to micro seismic monitoring interpretation technology field, specially relates to a correction method for micro seismic interpretation fracturing fracture parameter result.

RELATED APPLICATIONS

The present application is a U.S. National Phase of International Application Number PCT/CN2020/100548, filed Jul. 7, 2020, and claims priority to Chinese Application Number 201910626869.X, filed Jul. 11, 2019.

BACKGROUND

With the development of mineral exploitation technologies, the behavior of hydraulic fractures meeting natural fractures has got more and more attention. Hydraulic fracturing is a widely accepted main stimulation technology used for enhancing oil recovery in tight fractured reservoirs. The hydraulic fractures produced by hydraulic fracturing can activate natural fractures, then complex dispersive fracture network is formed, which achieves the effect of increasing permeability and production. Therefore, the research on the intersection mode and effect of hydraulic fractures and natural fractures has high application value.

Micro seismic monitoring is one of the effective methods to interpret the fracture length, fracture height and orientation of artificial fractures (i.e. hydraulic fractures). The hydraulic fracturing micro seismic fracture monitoring technology can be used to indicate the fracture position, analyze the fracture propagation, assist the accurate inversion of micro seismic position, and guide the hydraulic fracturing operation. The hydraulic fracturing micro seismic fracture monitoring technology interprets the parameters of artificial fracture morphology after fracturing by monitoring the micro seismic events in the process of hydraulic fracturing.

At present, most of the research focuses on the improvement on the theoretical algorithm of micro seismic reconstruction. Due to the influence of noise, the fracture parameters of micro seismic interpretation are distorted during the process of micro seismic monitoring. The fracture morphology of micro seismic interpretation often does not have a corresponding relationship with sand adding amount and fluid amount in the field fracturing process. As a result, the fracture parameters of micro seismic inversion have no reference value, which seriously affects the evaluation of fracture morphology and fracturing effect after fracturing.

Therefore, it is necessary to invent a correction method for micro seismic interpretation fracturing fracture parameter result, so as to more accurately and truly deduce fracture parameters, indicate fracture position, analyze fracture propagation, assist accurate inversion of the micro seismic position, and guide hydraulic fracturing operation.

SUMMARY OF THE INVENTION

A large number of micro seismic signal event points will be generated during high flow rate fracturing construction. It is difficult to truly interpret the effective fracture morphology after fracturing by using the micro seismic monitoring data. Therefore, it is necessary to correct the micro seismic interpretation results combined with the field construction parameters (pair). The invention aims to provide a correction method for micro seismic interpretation fracturing fracture parameter result.

The invention provides a correction method for micro seismic interpretation fracturing fracture parameter result. The method comprises the steps that:
A. classifying the communication modes of a block sampling fractured well to be corrected (partial sampling as learning sample) according to the matching degree of micro seismic monitoring result and sand adding amount;
B. correcting the volume coefficient of each said classified fractured well single well, and the volume correction coefficient $B_v$ of each said fractured well is shown as follows:

$$B_v = \frac{[L^{5/4}H]_T}{[L^{5/4}H]_W}$$

Wherein, $[L^{5/4}H]_W$ is a calculation value of a micro seismic monitoring interpretation result; $[L^{5/4}H]_T$ is a theoretical calculation value obtained by using field construction parameters;

$$[L^{5/4}H]_T = \frac{E_f V_i}{\pi 4\alpha \left[\frac{1}{60}\frac{(1-v^2)Q\mu}{E}\right]^{1/4}}, \text{ and}$$

$$V_i = V_{fp} + V_{fs}, E_f = 1 - \sqrt{\frac{V_{fp}}{V_i}},$$

In the above formula, L is the fracture half length and the unit is m; H is the fracture height and the unit is m; $E_f$ is the total fracture initiation efficiency; $V_i$ is the amount of effective fracture initiation fluid and the unit is m³; $V_{fp}$ is the amount of pre-fluid and the unit is m³; $V_{fs}$ is the amount of sand carrying fluid and the unit is m³; μ is the viscosity of fracturing fluid and the unit is Pa·s; Q is the flow rate and the unit is m³/min; ν is the Poisson's Ratio of the rock; E is the elastic modulus and the unit is GPa; If Q is equal to surface total flow rate, α=1.26; If Q is equal to the half of surface total flow rate, α=1.5; C, calculating the classification volume correction coefficient of each class of fractured well according to the calculated single well volume correction coefficient of each said fractured well. The classification volume correction coefficient of each class is the average of the calculation results of single well volume correction coefficients of this class of fractured well.

In the said correction method for micro seismic interpretation fracturing fracture parameters result, the standard of classifying the communication mode of the block sampling fractured wells to be corrected according to the matching degree between the micro seismic monitoring results and the sand adding amount is: when the ratio of the hydraulic fracture length (the sum of double wings fractures length) of micro seismic interpretation and the sand adding amount is less than 10, hydraulic fracture of micro seismic interpretation and corresponding sand adding amount are used as the classification basis. When the ratio of the hydraulic fracture length of micro seismic interpretation and the sand adding amount is greater than or equal to 10, the sand adding amount is used as the classification basis.

In the said correction method for micro seismic interpretation fracturing fracture parameters result, when the hydraulic fracture of micro seismic interpretation and corresponding sand adding amount are used as classification basis, principal components of hydraulic fractures length of micro seismic interpretation and sand adding amount is calculated by using mathematical analysis. The value of the principal components will be used as the classification basis. The bigger the value of principal components of fractures length of micro seismic interpretation and sand adding amount, the bigger the construction sand adding amount and said fractures length, and vice versa.

In the said correction method for micro seismic interpretation fracturing fracture parameters result, when the value of principal components is less than 130, said fractured well is classified as the first class; when the value of principal components is 130-160, said fractured well is classified as the second class type I; when the value of principal components is 160-200, said fractured well is classified as the second class type II; when the value of principal components is 200-250, said fractured well is classified as the third class type I; when the value of principal components is larger than 250, said fractured well is classified as the third class type II.

In the said correction method for micro seismic interpretation fracturing fracture parameters result, during the calculation of the principal components, statistics is performed on the sand adding amount and micro seismic interpretation fractures length of a part of sample fractured wells of the block to be corrected at first, a two-dimensional random variable observation matrix which is composed by sand adding amount and fractures length is obtained, then the observation matrix is calculated to get mean vector; after that, A matrix of two-dimensional random variable samples of this block is obtained by calculating, then, total covariance S* is replaced by unbiased estimation of samples; next step, feature vectors of block classification correlation coefficient matrix is obtained by calculating; if the first principal component contribution rate calculated cannot meet demand, second principal components will be added; If the first principal components contribution rate calculated meets demand, the classification is conducted on the basis of the first principal components.

In the said correction method for micro seismic interpretation fracturing fracture parameters result, when said covariance matrix has large numerical difference, principal components of sampling fractured wells of said block are solved based on correlation coefficient matrix; the correlation coefficient matrix of said two-dimensional random variable of said block could be calculated according to said sample covariance matrix; after that, the feature vectors of correlation coefficient matrix of said block could be calculated according to said correlation coefficient matrix.

In the said correction method for micro seismic interpretation fracturing fracture parameters result, when the sand adding amount is less than 10 m$^3$, said fractured well will be classified as the first class; when the sand adding amount is 10-13 m$^3$, said fractured well will be classified as the second class type I; when the sand adding amount is 13-16 m$^3$, said fractured well will be classified as the second class type II; when the sand adding amount is 16-20 m$^3$, said fractured well will be classified as the third class type I; when the sand adding amount is larger than 20 m$^3$, said fractured well will be classified as the third class type II.

In the said correction method for micro seismic interpretation fracturing fracture parameters result, correction coefficient $B_L$ of classification fracture half length of each class of said fractured wells is obtained according to the classification volume correction coefficient of each class of said fractured wells.

$$B_L = \alpha^{5/4}$$

wherein,
$\alpha = B_{V_{avg}}^{4/9}$, $B_{V_{avg}}$ is the classification volume correction coefficient of said fractured well.

In the said correction method for micro seismic interpretation fracturing fracture parameters result, fracture height correction coefficient $B_H$ is obtained according to said volume correction coefficient.

$$B_H = \alpha$$

wherein,
$\alpha = B_{V_{avg}}^{4/9}$, $B_{V_{avg}}$ is the classification volume correction coefficient of said fractured well.

In the said correction method for micro seismic interpretation fracturing fracture parameters result, the fractures of said fractured well are symmetrical vertical fractures on both wings and the horizontal section shape of fractured well is ellipse.

According to the invention, the micro seismic interpretation result can be corrected in combination with the field construction parameters, so that the micro seismic monitoring data can be utilized to truly interpret the effective fracture morphology after fracturing, the accurate inversion of the microseism position can be assisted, and the hydraulic fracturing construction operation can be effectively guided.

EMBODIMENT

Hereinafter, the preferred embodiments of the present invention will be described in detail with reference to the accompanying figures in order to understand the purpose, features and advantages of the present invention more clearly. It should be understood that the embodiments shown in the figures do not limit the scope of the present invention, but merely illustrate the essential spirit of the technical solution of the present invention.

A large number of micro seismic signal event points will be generated during high flow rate fracturing construction. It is difficult to truly interpret the effective fracture morphology after fracturing according to the micro seismic monitoring data. Therefore, it is necessary to correct the micro seismic interpretation results combined with the field operation parameters.

In the present invention, the communication mode of fractures is classified. In this embodiment, based on 36 fractured wells in Qinghai Oilfield, the communication mode between hydraulic fractures and natural fractures is defined and a classification method of fractured wells based on the fracture communication mode is given. Based on the micro seismic monitoring results and field construction parameters (sand adding mount), the correction coefficients (volume correction coefficient, fracture length correction coefficient and fracture height correction coefficient) of the micro seismic interpretation results of fractured wells from these three classes of fracture communication modes are theoretically deduced and actual calculated to provide basis for actual construction on site.

The development of natural fractures in the reservoir is an objective condition for the appearance of complex fracture morphology after fracturing. During the fracturing construction, artificial fractures communicate with natural fractures to form a complex fracture system, otherwise a single double-wing main fracture will be formed. Before performing the classification of the combination of natural fractures and hydraulic fractures, it is necessary to characterize the development of artificial fractures in the fractured well section of the research block to evaluate whether the research block has the possibility of forming a complex fracture network. Therefore, it is necessary to classify and characterize the morphology of the fractured well section after artificial fractures communicating with natural fractures, to provide basis for effective signal identification of micro seismic monitoring and subsequent deducing correction coefficient.

Figure 1A:
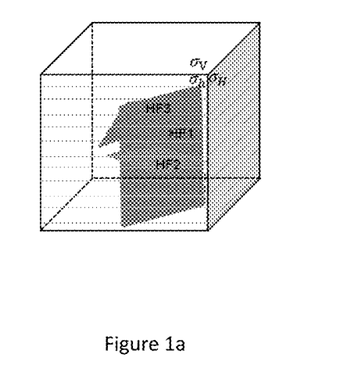
FIG. 1a is a schematic diagram of the first class of fractured well of the invention.
Figure 1B:
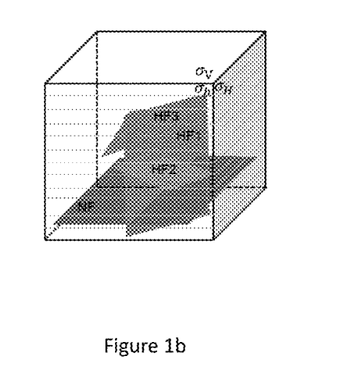
FIG. 1b is a schematic diagram of the second class of fractured well of the invention.
Figure 1C:
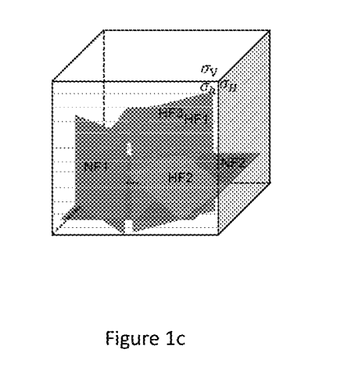
FIG. 1c is a schematic diagram of the third class of fractured well of the invention.

According to the field construction situation, the communication mode between hydraulic fractures and natural fractures after fracturing are divided into three classes, as shown in FIG. 1a, FIG. 1b, and FIG. 1c. FIG. 1a shows the first class: natural fractures are not developed; the main fracture of hydraulic fracture is a single horizontal fracture without communicating with natural fractures. FIG. 1b shows the second class: natural fractures are relatively developed; the morphology of hydraulic fractures is relatively simple and communicates with some natural fractures. FIG. 1c shows the third class: natural fractures are developed, hydraulic fractures are multiple groups of fractures with different occurrences, which communicate with natural fractures to form a complex combination. Wherein, the meaning of each parameter in the figure is as follows:

$\sigma_v$ is the vertical normal stress;
$\sigma_H$ is the horizontal maximum principal stress;
$\sigma_h$ is the horizontal minimum principal stress;
HF is the hydraulic fracture (HF1 represents the first hydraulic fracture, and so on);
NF is the natural fracture (NF1 represents the first hydraulic natural fracture, and so on).

In the classification analysis of the communication mode between hydraulic fractures and natural fractures, the field quantitative data used are mainly the interpretation results of micro seismic monitoring fracture length and the sand adding amount on site. The treatment process can be divided into two types:

(1) When there is a contradiction between the micro seismic monitoring results and the sand adding amount, that is, the hydraulic fractures of the micro seismic interpretation is long but the sand adding amount on site is small, at this time, the low feasibility of the micro seismic interpretation results can be considered, and the actual construction sand adding amount is mainly used as the classification basis.

(2) When the matching degree between micro seismic monitoring results and the sand adding amount is good, that is, the long hydraulic fractures from the micro seismic interpretation correspond to a big sand adding amount, and vice versa, at this time, due to the strong correlation between the two, you can consider defining the two as a new principal component by using the principal component analysis theory of mathematical analysis to reduce the dimension of multivariate variables and simplify the classification process.

Figure 2:
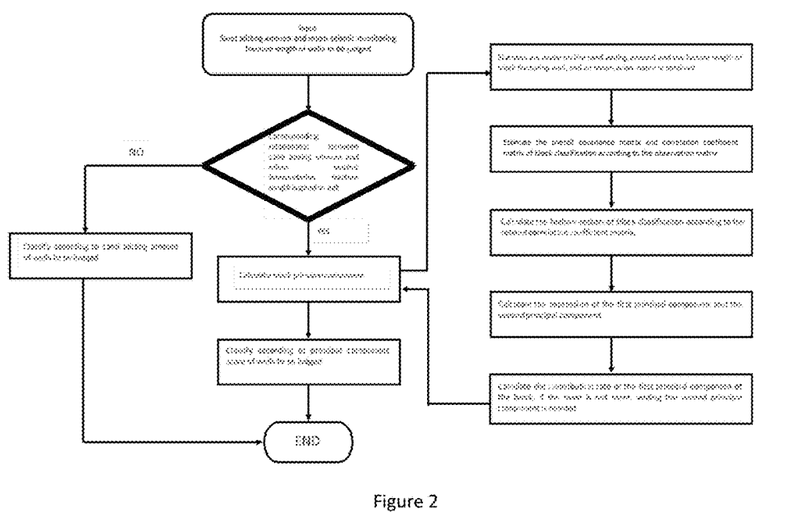
FIG. 2 is the classification flow diagram of the fractured well of the invention.

The specific classification process is shown in FIG. 2, including inputting sand adding amount and micro seismic monitoring fracture length of wells to be judged; determining whether the sand adding amount and the micro seismic monitoring fracture length is in a good corresponding relationship; if not, classifying according to sand adding amount of wells to be judged, if so, calculating block principal component and classifying according to principal component score of wells to be judged. In the step of calculating block principal component, firstly, statistics are made on the sand adding amount and the micro seismic interpretation fractures length in some sample fractured wells in a certain block. And a two-dimensional random variable observation matrix composed of the sand adding amount and the fracture length is obtained. And then the observation matrix is calculated to get the mean vector. Then the A matrix of the two-dimensional random variable sample of the block is obtained by calculating according to the formula.

According to the relevant knowledge of mathematical statistics, the unbiased estimation of the sample is used to replace the total covariance $S^*$.

If it is found from the covariance matrix of the sample that the values are quite different, in order to prevent the phenomenon that large number eat decimals, the principal component of the block sample can be solved based on the correlation coefficient matrix. The correlation coefficient matrix p of the two-dimensional random variable in the process of the classification of the block sample can be obtained according to the above said sample covariance matrix.

According to the correlation coefficient matrix, the feature vectors $\lambda_1$ and $\lambda_2$ of the block classification correlation coefficient matrix is obtained by calculating.

According to the formula, the contribution rate of the first principal component is obtained by calculating and is judged if it can meet the requirements.

If the requirements can be met, the feature vectors corresponding to the first principal component can be obtained as $\overline{X}$ $$\overline{X} = [c1 c2]'$$

Therefore, the first principal component can be expressed as:

$$F_1 = c1x_1 + c2x_2$$

Wherein, $x_1$ is the sand adding amount, and $x_2$ is the micro seismic interpretation fracture length (the sum of the fracture lengths of the double-wing).

If the contribution rate of the first principal component obtained by calculating cannot meet the requirements, the second principal component needs to be calculated so that the cumulative contribution rate of the first and second principal components meets the engineering requirements.

The above calculations are based on the existing mathematical statistics methods, and the calculation formulas are not given here in detail.

Figure 3:
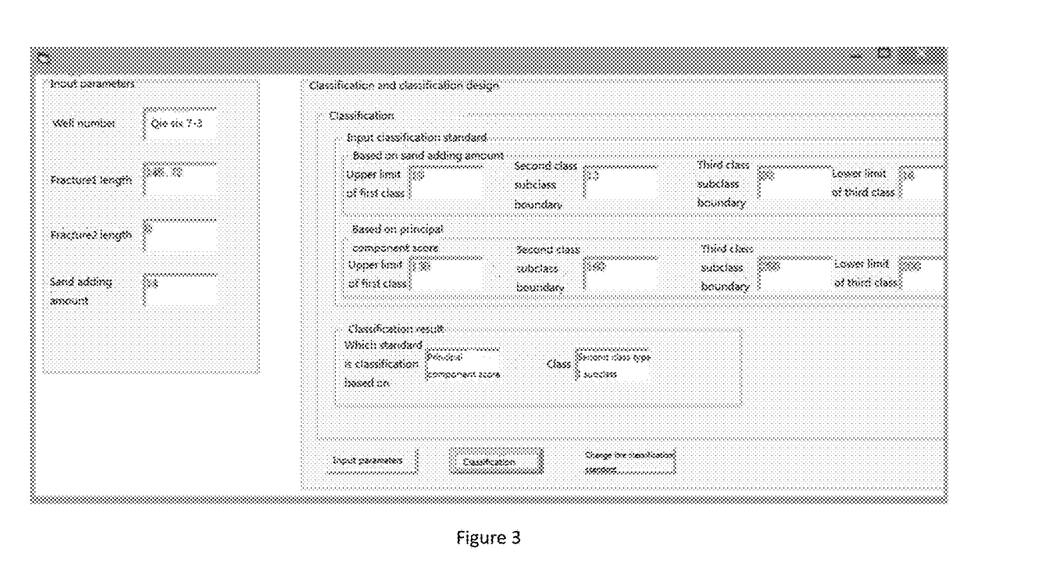
FIG. 3 is a schematic diagram of fractured well classification output results from an embodiment of the invention.

Based on the classification method of principal component analysis, in this embodiment, visual basic 6.0 is used as the platform to develop classification software. The software supports user-defined classification criteria. The output results mainly include the class which sample fractured well belongs to and the parameters which the classification is based on, etc., and its running interface is shown in FIG. 3.

The early stage design of hydraulic fracturing in the oil field often adopts the intuitive and quick PKN model, which assumes that the fracture space is distributed as a uniform ellipsoid. Therefore, the basic assumptions of the present invention are as follows:
(1) The proppant particles are in a suspended state in the high-viscosity fracturing fluid, and the sand carrying fluid advances in the fracture approximately like a plunger;
(2) The size of the sand ratio has no effect on the fluid loss characteristics of the sand carrying liquid;
(3) The fracture is a symmetrical double-wing vertical fracture, and the horizontal section shape of the fracture is an elliptical surface.

Figure 4:
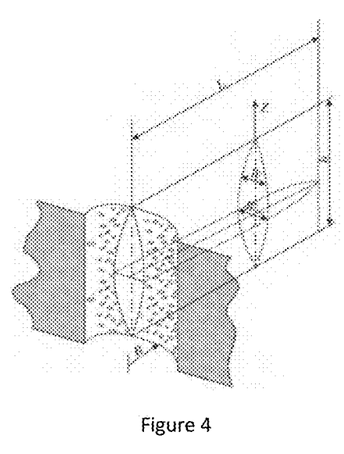
FIG. 4 is a schematic diagram of the fracture PKN model of the invention.

As shown in FIG. 4, in order to simplify the calculation, we use a PKN model as the calculated fracture model.

It can be classified according to the complexity of communication between hydraulic fractures and natural fractures, and the critical values of the various classes can be determined.

According to field construction needs, according to the range of the ratio of fracture length to sand adding amount, whether the actual construction sand adding amount on site can correspond well to the micro seismic interpretation fracture length is distinguished. Specifically:
(1) Classification Criteria Based on Principal Component Analysis According to field construction needs, it is believed that when the ratio of fracture length to sand adding amount is greater than or equal to a value, such as 10, the actual construction sand adding amount on site corresponds well to the micro seismic interpretation fracture, and the micro seismic interpretation fracture length and sand adding amount are used commonly as a classification criteria. Obviously, the higher the principal component score of the micro seismic interpretation fracture length and sand adding amount shows the larger construction sand adding amount and the fracture length, and the communication mode formed of natural fractures and the hydraulic fracture is also more complicated. Combined with field analysis, it is necessary to provide a classification criterion to classify the communication mode based on the principal component score.
(2) Classification Criteria Based on the Sand Adding Amount According to field construction needs, it is believed that when the ratio of fracture length to sand adding amount is less than a value, such as 10, the actual construction sand adding amount on site cannot correspond well to the micro seismic interpretation fracture length; the micro seismic interpretation results have no reference value; the micro seismic interpretation fracture length cannot be used as the classification criteria; but the sand adding amount is used as the classification criteria of communication modes.

According to the above classification criteria, the classification results of the sample wells to be judged in a certain block are obtained.

Then according to the classification results of block fractured wells, the volume correction data $B_V$ of various classes of wells is obtained; the classification volume correction coefficient is taken from the average of the calculation results of the single well volume correction coefficient in this class of wells. Then according to the calculation result of the volume correction coefficient of the block, the fracture half length correction coefficient $B_L$ and fracture height correction coefficient $B_H$ of various classes of wells are obtained according to the formula. The fracture half length is also called fracture radius. After the coal reservoir is fractured and strengthened, the distance that the fracture extends from the wellbore in the radial direction to the coal reservoir generally refers to the fracture length of the horizontal fracture. The fracture half length is one of the factors of the fracture size.

The derivation of each parameter correction of the present invention is as follows.

It is assumed that $V_i$ is the amount of effective fracture initiation fluid, which has the following relationship with the amount of pre-fluid$V_{fp}$ and the amount of sand carrying fluid$V_{fs}$:

$$V_i = V_{fp} + V_{fs} \qquad (1)$$

The amount of pre-fluid$V_{fp}$ and the amount of sand carrying fluid $V_{fs}$ can be directly measured and obtained according to field fracturing construction.

The concept of total fracture initiation efficiency $E_f$ in the continuous change formula of pump sand injection ratio proposed by K. G. Nolte is cited here, which represents the total fracture initiation efficiency of the pre-fluid and the sand carrying fluid.

$$E_f = \frac{2V_{frac}}{V_i} = 1 - \sqrt{\frac{V_{fp}}{V_i}} \qquad (2)$$

$E_f$ can be directly calculated and obtained according to the second equation in the above equation and field fracturing construction parameters.

Wherein:

$V_{frac}$ is the fracture volume of one side, m³.

According to the above PKN model, the maximum fracture width $W_{max}$ can be calculated and obtained by the following formula.

$$W_{max} = 2\alpha \left[ \frac{1}{60} \frac{(1-v^2)Q\mu L}{E} \right]^{1/4} \qquad (3)$$

Wherein:

$W_{max}$ is the maximum fracture width of Newtonian liquid under laminar flow conditions, m;

μ is the viscosity of the fracturing fluid, Pa·s;

Q is the flow rate, m³/min;

L is the fracture half length, m;

v is the Poisson's ratio of the rock;

E is the elastic modulus, GPa

When Q is equal to surface total flow rate, α=1.26. When Q is equal to the half of surface total flow rate, α=1.5. Since surface total flow rate is taken here, α=1.26. The value of Q can be determined according to personal calculation needs.

During the deduction of the correction coefficient, firstly the amount of effective fracture initiation fluid $V_i$ is calculated according to the amount of sand carrying liquid and the amount of pre-fluid on site by formula (1); and then the total fracture initiation efficiency $E_f$ is calculated according to formula (2); and finally the fracture volume is calculated and shown in formula (4):

$$V_{frac} = E_f V_i / 2 \quad (4)$$

On the other hand $$V_{frac} = \pi W_{max} L H \quad (5)$$

Wherein:
$W_{max}$ is the maximum fracture width of Newtonian liquid under laminar flow conditions, m;
L is the fracture half length, m;
H is the fracture height, m;
In the above formula, L and H are theoretical values.
Combine formula (5) with formula (3), obtain $$V_{frac} = \pi 2\alpha \left[ \frac{1}{60} \frac{(1-\upsilon^2)Q\mu}{E} \right]^{1/4} L^{5/4} H \quad (6)$$

Combine formula (6) with formula (4), obtain $$L^{5/4} H = \frac{E_f V_i}{\pi 4\alpha \left[ \frac{1}{60} \frac{(1-\upsilon^2)Q\mu}{E} \right]^{1/4}} \quad (7)$$

The volume correction coefficient $B_v$ can be obtained by making the ratio of $L^{5/4}H$ to the micro seismic monitoring result, which is:

$$B_v = \frac{[L^{5/4}H]_T}{[L^{5/4}H]_W} \quad (8)$$

Wherein:
$[L^{5/4}H]_W$ is the calculation value by using a micro seismic monitoring interpretation result (L and H are obtained by using micro seismic interpretation results);
$[L^{5/4}H]_T$ is a theoretical calculation value obtained by using field construction parameters (according to the calculation formula of formula 7, calculation value is obtained by using field construction parameters);

The obtained volume correction coefficient $B_V$ is performed inversion to the micro seismic interpretation result to obtain the fracture length and fracture height correction coefficient. The reduction process is as follows:

$$B_V [L^{5/4}H]_W = [L^{5/4}H]_T \quad (9)$$

and $$(La)^{5/4} Ha = [L^{5/4}H]_T \quad (10)$$

$$a^{5/4} = B_L$$

$$a = B_H$$

Wherein:
$B_L$ is the fracture half length correction coefficient;
$B_H$ is the fracture height correction coefficient.
and $$a^{9/4} = B_V \quad (11)$$

From formula (11), the intermediate variable a and correction coefficient can be inversely solved, and the fracture half length correction coefficient $B_L$ and fracture height correction coefficient $B_H$ can be obtained.

The correction coefficient derived above is the single well correction coefficient. In order to describe the fracture morphology of all classes of fractured wells, it is necessary to get all classes of correction coefficients. Only by obtaining all classes of correction coefficients can we correct the fracture morphology.

A classification volume correction coefficient of each class of fractured well is calculated. The classification volume correction coefficients of each class are the average of the calculation results of single well volume correction coefficients in this class of fractured well. During the calculation of all classes of fracture width and fracture height correction coefficient, $a = B_{V_{avg}}^{4/9}$, $B_{V_{avg}}$ is the classification volume correction coefficient of said fractured well.

According to the invention, the micro seismic interpretation result can be corrected in combination with the field construction parameters, so that the micro seismic monitoring data can be utilized to truly interpret the effective fracture morphology after fracturing. And then the accurate inversion of the micro seismic position can be assisted. The hydraulic fracturing construction operation can be effectively guided.

EXAMPLE

Statistics are made on the sand adding amount and micro seismic interpretation fracture length in 36 fractured wells in "Qie Liu" block. An observation matrix of two-dimensional random variables composed of the sand adding amount and the fracture length is obtained. And then the observation matrix is calculated to get the mean vector: $\overline{X} = [15.05 \quad 170.98]'$ The A matrix of the two-dimensional random variable sample of "Qie Liu" block is obtained by calculating according to the formula.

$$A = \begin{bmatrix} 816.56 & 4657.86 \\ 4657.86 & 240389.84 \end{bmatrix}$$

According to the relevant knowledge of mathematical statistics, the unbiased estimation of the sample is used to replace the total covariance.

$$S^* = \begin{bmatrix} 22.07 & 125.89 \\ 125.89 & 6497.02 \end{bmatrix}$$

It is found from the covariance matrix of the sample that the values are quite different, in order to prevent the phenomenon that large numbers eat decimals, the principal component of the "Qie Liu" block can be solved based on the correlation coefficient matrix. According to the above sample covariance matrix, the correlation coefficient matrix of the two-dimensional random variable in the classification process of the "Qie Liu" block can be solved and obtained.

$$\rho = \begin{bmatrix} 1 & 0.33 \\ 0.33 & 1 \end{bmatrix}$$

According to the correlation coefficient matrix, the feature vectors of classification correlation coefficient matrix of "Qie Liu" block are calculated and obtained.

$\lambda_1 = 1.58$ $\lambda_2 = 0.42$

According to the formula, the contribution rate of the first principal component is calculated and its value is 0.79. It meets the requirements.

The feature vectors corresponding to the first principal component can be obtained as $\overline{X} = [0.5\ 0.87]'$ Therefore, the first principal component can be expressed as:

$F_1 = 0.5x_1 + 0.87x_2$ $x_1$ is the sand adding amount, and $x_2$ is the micro seismic interpretation fracture length (the sum of the fracture lengths of the double-wing).

Since the number of fractured wells is big in "Qie Liu" block, the second class and the third class could be divided into two subclasses according to the complexity of communication between the hydraulic fractures and the natural fractures, and then the critical value of each class is determined.

(1) Classification Criteria Based on Principal Component Analysis

Obviously, the higher the principal component score shows the larger construction sand adding amount and the fracture length, and the communication mode formed of natural fractures and hydraulic fractures is also more complicated. Combined with field analysis, it is necessary to provide a classification criterion to classify the communication mode based on the principal component score. The classification criteria is shown in Table 1.1

TABLEt 1 the table of classification criteria based on principal component score

| major class | subclass | principal component score |
|---|---|---|
| first class | — | <130 |
| second class | I | 130-160 |
|  | II | 160-200 |
| third class | I | 200-250 |
|  | II | >250 |

(2) Classification Criteria Based on the Sand Adding Amount

According to field construction needs, it is believed that when the ratio of fracture length to sand adding amount is less than 10, the actual construction sand adding amount on site cannot correspond well to the micro seismic interpretation fracture length; the micro seismic interpretation results have no reference value; the micro seismic interpretation fracture length cannot be used as the classification criteria, but the sand adding amount is used as the classification criteria of communication modes. The criterion is shown in Table 1.2.

TABLE 1.2 the table of classification criteria based on the sand adding amount in "Qie Liu" block

| major class | subclass | sand adding amount, m³ |
|---|---|---|
| first class | — | <10 |
| second class | I | 10-13 |
|  | II | 13-16 |
| third class | I | 16-20 |
|  | II | >20 |

By inputting one by one the parameters of 36 wells to be judged into the software, the classification results of 36 wells to be judged in "Qie Liu" block can be obtained, as shown in table 1.3.

TABLE 1.3 the table of classification results of fractured wells in "Qie Liu" block

| major class | subclass | wells numbers |
|---|---|---|
| first class | — | "Qie Liu" 4-17well, "Qie Liu" 7-5 well, "Qie Liu"10-12well, "Qie Liu"8-10 well, "Qie Liu"5-28 well |
| second class | I | "Qie Liu" 6-14 well, "Qie Liu" 5-17 well, "Qie Liu" 4-12 well, "Qie Liu" 4-15 well, "Qie Liu" 7-7 well, "Qie Liu" 5-13 well, "Qie Liu" 11-10 well, "Qie Liu" 6-16 well, "Qie Liu" 8-5 well |
|  | II | "Qie Liu"7-3 well, "Qie Liu"8-13 well, "Qie Liu"9-9 well, "Qie Liu" 9-11 well, "Qie Liu" 10-6 well, "Qie Liu" 6-22 well |
| third class | I | "Qie Liu"4-16 well, "Qie Liu"4-14 well, "Qie Liu"9-7 well, "Qie Liu" 6-11 well, "Qie Liu" 8-15 well, "Qie Liu" 6-10 well, "Qie Liu" 8-6 well, "Qie Liu" 6-6 well, "Qie Liu" 3-13 well, "Qie Liu" 7-3 well, "Qie Liu" 7-5 well |
|  | II | "Qie Liu"6-18 well "Qie Liu"3-15 well, "Qie Liu"4-13 well, "Qie Liu" 5-7 well, "Qie Liu" 10-13 well |

According to the classification results of fractured wells in "Qie Liu" block, the volume correction data $B_V$ of the first class wells, the second class wells, the third class wells and their subclasses are obtained respectively according to the derivation idea of the invention. The classification volume correction coefficient is taken from the average of the calculation results of the single well volume correction coefficient in this class of well. Here, the elastic modulus and Poisson's ratio of the rock in "Qie Liu" block are 336 GPa and 0.2 respectively. The fracture half length is the average of the two half fractures lengths of the micro seismic monitoring results. Table 2.1 shows the calculation results of various class volume correction factors in the "Qie Liu" block.

TABLE 2.1 the table of calculation result of volume correction coefficient in "Qie Liu" block

| major class | subclass | volume correction coefficient |
|---|---|---|
| first class | — | 0.78 |
| second class | I | 0.9 |
|  | II | 1.02 |

TABLE 2.1-continued the table of calculation result of volume correction coefficient in "Qie Liu" block

| major class | subclass | volume correction coefficient |
|---|---|---|
| third class | I | 1.06 |
|  | II | 1.11 |

According to the calculation result of the volume correction coefficient of the "Qie Liu" block, the fracture half length correction coefficient $B_L$ and fracture height correction coefficient $B_H$ of various classes and its subclasses are obtained according to the formula (9), (10), (11). The statistical results are shown in table 2.2.

TABLE 2.2 the statistical table of each correction coefficients of fractured wells in "Qie Liu" block

| major class | subclass | $B_V$ | a | $B_L$ | $B_H$ |
|---|---|---|---|---|---|
| first class | — | 0.78 | 0.897444 | 0.873492 | 0.897444 |
| second class | I | 0.9 | 0.95507 | 0.944156 | 0.95507 |
|  | II | 1.02 | 1.009695 | 1.012133 | 1.009695 |
| third class | I | 1.06 | 1.024743 | 1.031023 | 1.024743 |
|  | II | 1.11 | 1.048411 | 1.060876 | 1.048411 |

Figure 5A:
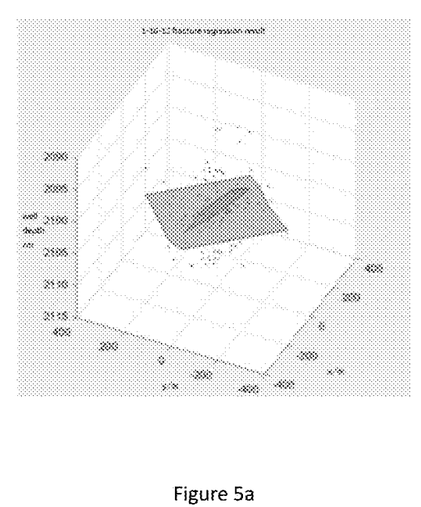
FIG. 5a is a schematic diagram of micro seismic fracture regression results of well 10-12 from an embodiment of the invention.
Figure 5B:
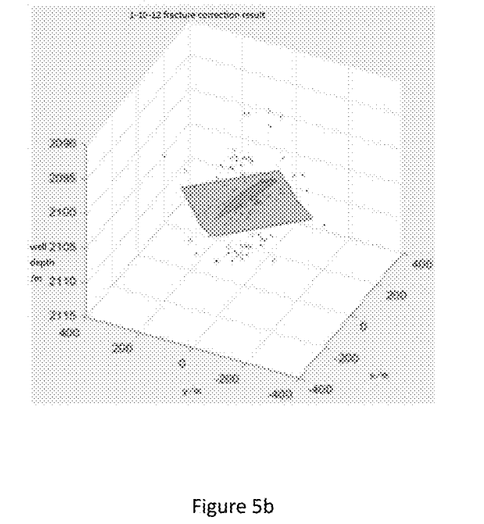
FIG. 5b is a schematic diagram of micro seismic fracture correction results of well 10-12 from an embodiment of the invention.
Figure 6A:
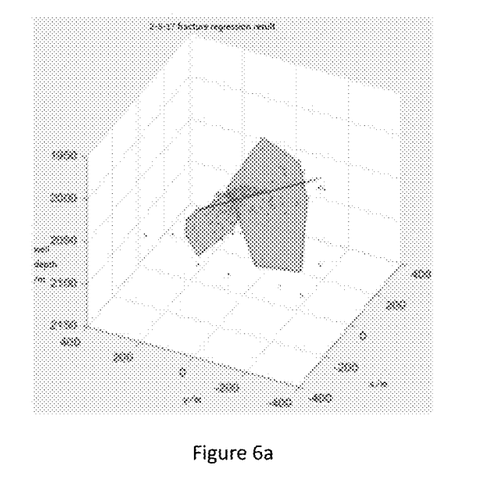
FIG. 6a is a schematic diagram of micro seismic fracture regression results of well 5-17 from an embodiment of the invention.
Figure 6B:
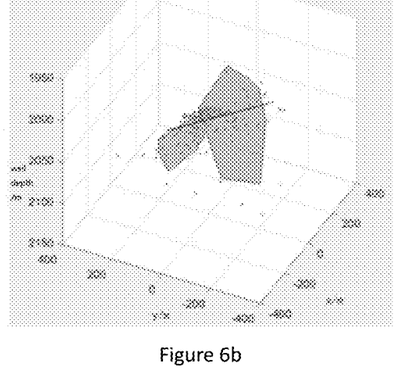
FIG. 6b is a schematic diagram of micro seismic fracture correction results of well 5-17 from an embodiment of the invention.
Figure 7A:
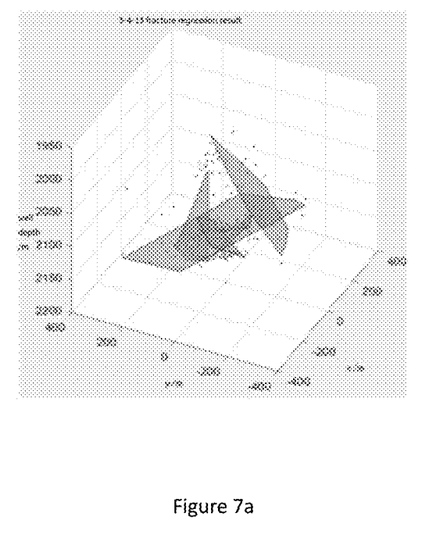
FIG. 7a is a schematic diagram of micro seismic fracture regression results of well 4-13 from an embodiment of the invention.
Figure 7B:
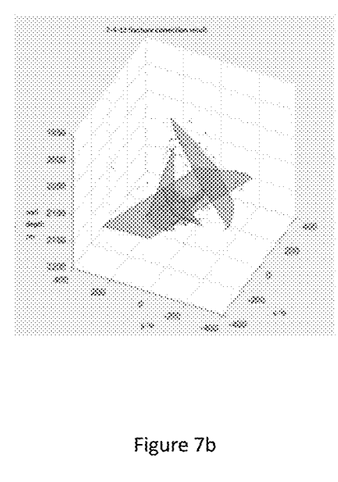
FIG. 7b is a schematic diagram of micro seismic fracture correction results of well 4-13 from an embodiment of the invention.

Taking well 10-12, well 5-17 and well 4-13 in "Qie Liu" block as three classes of typical wells, the artificial fractures are reconstructed based on the octree theory algorithm using the original micro seismic data, and the reconstruction results of artificial fractures are corrected while considering the correction coefficient. The regression and correction results of the three classes of wells are shown in FIG. 5a which is a schematic diagram of micro seismic fracture regression results of well 10-12, FIG. 5b which is a schematic diagram of micro seismic fracture correction results of wells 10-12, FIG. 6a which is a schematic diagram of micro seismic fracture regression results of wells 5-17, FIG. 6b which is a schematic diagram of micro seismic fracture correction results of wells 5-17, FIG. 7a which is a schematic diagram of micro seismic fracture regression results of wells 4-13, and FIG. 7b which is a schematic diagram of micro seismic fracture correction results of wells 4-13.

From the above comparative analysis, it can be seen that the fractures reconstructed according to the correction method of the invention are different from those before the initial correction, and the difference between the results of different classes of well fractures after correction and the initial results is different. The correction fracture morphology parameters of the first class of well are less than those before the correction, the parameters of the second class of well before and after the correction keep almost the same, and the correction fracture morphology parameters of the third class of well are larger than those before the correction.

The above-mentioned embodiments are only used to illustrate the invention, in which all parts, devices, methods and steps of the embodiments can be changed, and all equivalent transformations and improvements based on the technical scheme of the invention shall not be excluded from the protection scope of the invention.

The invention claimed is:

1. A correction method for micro seismic interpretation of fractured well parametric data, the method comprises:

A. classifying communication modes of block sampling fractured wells to be corrected according to a matching degree of micro seismic monitoring result and sand adding amount to obtain a plurality of classified fractured wells;
B. correcting a volume coefficient $B_v$ of each of the classified fractured wells, wherein the volume correction coefficient $B_v$ of each of the classified fractured wells is represented by an expression:

$$B_v = \frac{[L^{5/4}H]_T}{[L^{5/4}H]_W}$$

wherein, $[L^{5/4}H]_W$ is a calculation value of a micro seismic monitoring interpretation result; $[L^{5/4}H]_T$ is a theoretical calculation value obtained by using field construction parameters;

$$[L^{5/4}H]_T = \frac{E_f V_i}{\pi 4\alpha \left[\frac{1(1-v^2)Q\mu}{60E}\right]^{1/4}}, \text{ and}$$

$$V_i = V_{fp} + V_{fs}, E_f = 1 - \sqrt{\frac{V_{fp}}{V_i}},$$

wherein, in the above formula,
L is a fracture half length and the unit is m;
H is a fracture height and the unit is m;
$E_f$ is a total fracture initiation efficiency;
$V_i$ is an amount of effective fracture initiation fluid and the unit is m³; $V_{fp}$ is an amount of pre-fluid and the unit is m³;
$V_{fs}$ is an amount of sand carrying fluid and the unit is m³;
μ is a viscosity of fracturing fluid and the unit is Pa·s;
Q is a flow rate and the unit is m³/min;
v is Poisson's Ratio of a rock through which the classified fractured well is drilled;
E is the elastic modulus and the unit is GPa;
if Q is equal to a surface total flow rate, α=1.26; and
if Q is equal to half of the surface total flow rate, α=1.5;

C. calculating a classification volume correction coefficient of each class of fractured wells according to the calculated single well volume correction coefficient of each fractured well, wherein the classification volume correction coefficient of a class is the average of the calculated single well volume correction coefficients for a class of fractured well; and D. reconstructing artificial fractures by using original micro seismic data while considering the classification volume correction coefficient for each class of the classified fractured wells.

2. A correction method according to claim 1, wherein, the standard of classifying the communication mode of the sampling fractured wells of the block to be corrected according to the matching degree between the micro seismic monitoring results and the sand adding amount is:

when the ratio of the total micro seismic interpretation hydraulic fracture length to the sand adding amount is less than 10, the hydraulic fracture of micro seismic interpretation and corresponding sand adding amount are used as classification bases; and when the ratio of the micro seismic interpretation hydraulic fracture length to the sand adding amount is greater than or equal to 10, the sand adding amount is used as the classification basis.

3. A correction method according to claim 2, wherein, when the hydraulic fracture of micro seismic interpretation and corresponding sand adding amount are used as classification bases, principal components of hydraulic fractures length of micro seismic interpretation and sand adding amount are calculated by using mathematical analysis; a value of the principal components will be used as the classification basis; the bigger the value of principal components of fractures length of micro seismic interpretation and sand adding amount, means the bigger the construction sand adding amount and said fractures length, and vice versa.

4. A correction method according to claim 3, wherein
when the value of principal components is less than 130, the fractured well is classified as the first class;
when the value of principal components is 130-160, the fractured well is classified as the second class type I;
when the value of principal components is 160-200, the fractured well is classified as the second class type II;
when the value of principal components is 200-250, the fractured well is classified as the third class type I; and
when the value of principal components is larger than 250, the fractured well is classified as the third class type II.

5. A correction method according to claim 4, wherein during the calculation of the principal components, a statistical analysis is performed on the sand adding amount and micro seismic interpretation fractures length of a part of sample fractured wells of the block to be corrected at first, a two-dimensional random variable observation matrix which is composed by sand adding amount and fractures length is obtained, then the observation matrix is calculated to get mean vector; after that, A matrix of two-dimensional random variable samples of this block is obtained by calculating, then, total covariance S* is replaced by unbiased estimation of samples; next step, feature vectors of block classification correlation coefficient matrix is obtained by calculating; if the first principal components contribution rate calculated cannot meet demand, second principal components will be added; if the first principal components contribution rate calculated meets demand, the classification is conducted on the basis of the first value of principal components.

6. A correction method according to claim 5, wherein, when the covariance matrix has large numerical difference, principal components of sampling fractured wells of the block are solved based on correlation coefficient matrix; the correlation coefficient matrix of said two-dimensional random variable of the block could be calculated according to the sample covariance matrix; after that, the feature vectors of correlation coefficient matrix of the block could be calculated according to said correlation coefficient matrix.

7. A correction method according to claim 2, wherein, when said sand adding amount is less than 10 $m^3$, the fractured well will be classified as the first class; when the sand adding amount is 10-13 $m^3$, said fractured well will be classified as the second class type I; when the sand adding amount is 13-16 $m^3$, said fractured well will be classified as the second class type II; when the sand adding amount is 16-20 $m^3$, said fractured well will be classified as the third class type I; when the sand adding amount is larger than 20 $m^3$, the fractured well will be classified as the third class type II.

8. A correction method according to claim 1, wherein, correction coefficient $B_L$ of classification fracture half length of each class of said fractured wells is obtained according to the classification volume correction coefficient of each class of said fractured well, $$B_L = a^{5/4}$$

wherein
$a = B_{V_{avg}}^{4/9}$ and $B_{V_{avg}}$ is the classification volume correction coefficient of the fractured well.

9. A correction method according to claim 1, wherein, fracture height correction coefficient $B_H$ is obtained according to volume correction coefficient, $$B_H = a$$

wherein, $a = B_{V_{avg}}^{4/9}$, $B_{V_{avg}}$ is the classification volume correction coefficient of the fractured well.

10. A correction method according to claim 9, wherein, the fractures of the fractured well are symmetrical vertical fractures on both wings, and the horizontal section shape of fractured well is ellipse.

* * * * *